United States Patent
Lakshmi Narasimha et al.

(10) Patent No.: US 10,879,821 B2
(45) Date of Patent: Dec. 29, 2020

(54) ROTOR POSITION ESTIMATION

(71) Applicant: TEXAS INSTRUMENTS INCORPORATED, Dallas, TX (US)

(72) Inventors: Rajan Lakshmi Narasimha, Dallas, TX (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/457,064

(22) Filed: Jun. 28, 2019

(65) Prior Publication Data
US 2020/0021214 A1   Jan. 16, 2020

Related U.S. Application Data

(60) Provisional application No. 62/696,186, filed on Jul. 10, 2018.

(51) Int. Cl.
| | | |
|---|---|---|
| *H02P 6/04* | (2016.01) | |
| *H02P 6/18* | (2016.01) | |
| *H02P 21/32* | (2016.01) | |
| *H02P 6/182* | (2016.01) | |

(Continued)

(52) U.S. Cl.
CPC ............. *H02P 6/181* (2013.01); *H02P 6/182* (2013.01); *H02P 6/183* (2013.01); *H02P 6/185* (2013.01); *H02P 21/13* (2013.01); *H02P 21/32* (2016.02)

(58) Field of Classification Search
CPC .......... H02P 21/05; H02P 21/13; H02P 21/14; H02P 21/18
See application file for complete search history.

(56) References Cited

U.S. PATENT DOCUMENTS

| | | |
|---|---|---|
| 5,585,709 A | 12/1996 | Jansen et al. |
| 6,492,788 B1 | 12/2002 | Agirman et al. |
| 8,693,220 B2 | 4/2014 | Klodowski et al. |

(Continued)

OTHER PUBLICATIONS

Corley, M.J. and Lorenz, R.D. "Rotor Position and Velocity Estimation for a Salient-Pole Permanent Magent Synchronous Machine at Standstill and High Speeds." IEEE Transactions on Industry Applications, vol. 34, No. 4, Jul./Aug. 1998. pp. 784-789.

(Continued)

*Primary Examiner* — Karen Masih
(74) *Attorney, Agent, or Firm* — Michael A. Davis, Jr.; Charles A. Brill; Frank D. Cimino (57) ABSTRACT

A motor controller includes current measurement circuitry and estimation circuitry. The current measurement circuitry is adapted to be coupled to a motor, and configured to measure current in the motor. The estimation circuitry is coupled to the current measurement circuitry, and includes a memory, current computation circuitry, and summation circuitry. The memory stores coefficients of a function for estimating current related to variation of inductance of the motor. The current computation circuitry is coupled to the memory, and is configured to compute a compensation current value based on the coefficients. The summation circuitry is coupled to the current compensation circuitry, and is configured to generate a position error signal by subtracting the compensation current value from a measured current value generated by the current measurement circuitry.

23 Claims, 6 Drawing Sheets

(51) Int. Cl.
*H02P 21/13* (2006.01)
*H02P 6/185* (2016.01)

(56) References Cited

U.S. PATENT DOCUMENTS

| | | | |
|---|---|---|---|
| 9,270,220 | B2 | 2/2016 | Magee et al. |
| 9,305,548 | B2 | 4/2016 | Kennewick et al. |
| 9,825,564 | B2 | 11/2017 | Magee et al. |
| 9,991,777 | B2 | 6/2018 | Lynch et al. |
| 9,998,052 | B2 | 6/2018 | Shimada et al. |
| 2007/0040528 | A1 | 2/2007 | Tomigashi et al. |
| 2011/0309781 | A1 | 12/2011 | Tomigashi |
| 2014/0225548 | A1 | 8/2014 | Xu et al. |
| 2014/0327379 | A1 | 11/2014 | Yang et al. |
| 2015/0357956 | A1 | 12/2015 | Shimada et al. |
| 2017/0006303 | A1* | 1/2017 | Sethuraman ........... H04N 19/58 |

OTHER PUBLICATIONS

Wang, L. and Lorenz, R.D. "Rotor Position Estimation for Permanent Magnet Synchronous Motor Using Salience-Tracking Self Sensing Method." [2000 IEEE] Industry Applications Conference, 2000, pp. 445-445.

Jansen, P.L. and Lorenz, R.D. "Transducerless Position and Velocity Estimation in Induction and Salient AC Machines." IEEE Transactions on Industry Applications, vol. 31, No. 2, Mar./Apr. 1995. pp. 240-246.

Bianchi, N. et al. "Effect of Stator and Rotor Saturation on Sensorless Rotor Position Detection." IEEE Transactions on Industry Applications, vol. 49, No. 3, May/Jun. 2013. pp. 1333-1342.

Barcaro, M. et al. "Iron Saturation Impact on High Frequency Sensorless Control of Synchronous Permanent Magnets Motor." 978-1-5090-2538-1 @2016 IEEE. pp. 1085-1091.

Li, Y. et al. "Improved Rotor-Position Estimation by Signal Injection in Brushless AC Motors, Accounting for Cross-Coupling Magnetic Saturation." IEEE Transactions on Industry Applications, vol. 45, No. 5, Sep./Oct. 2009. pp. 1843-1850.

Raca, D. et al. "Carrier-Signal Selection for Sensorless Control of PM Synchronous Machines at Zero and Very Low Speeds." IEEE Transactions on Industry Applications, vol. 46, No. 1, Jan./Feb. 2010. pp. 167-178.

Reigosa, D. D. et al. "Measurement and Adaptive Decoupling of Cross-Saturation Effects and Secondary Saliences in Sensorless Controlled IPM Synchronous Machines." IEEE Transactions on Industry Applications, vol. 44, No. 6, Nov./Dec. 2008. pp. 1758-1767.

Ji-Hoon Jang, et al, "Analysis of Permanent-Magnet Machine for Sensorless Control Based on High-Frequency Signal Injection", IEEE Transactions on Industrial Applications, vol. 40, No. 6, Nov./Dec. 2004, pp. 1595-1604.

Patrick Carner, "Increased Integration, Improved Feature Sets and New Software for Motor Control Systems: C2000 Piccolo F2805x microcontrollers", whitepaper, Texas Instruments, Inc., Nov. 2012, pp. 1-9.

"Clarke & Park Transforms on the TMS320C2xx", Application Report Literature No. BPRA048, Texas Instruments, Inc., 1997, pp. 1-46.

* cited by examiner

ROTOR POSITION ESTIMATION

CROSS-REFERENCE TO RELATED APPLICATIONS

The present application claims priority to U.S. Provisional Patent Application No. 62/696,186, filed Jul. 10, 2018, entitled "Sensorless Angle Estimation," which is hereby incorporated herein by reference in its entirety.

BACKGROUND

A permanent magnet motor represents a type of motor where a fixed stator causes rotation of a movable rotor. The rotor typically includes multiple magnets embedded in or connected to the rotor, and the stator typically includes multiple conductive windings. Electrical current in the windings generates a rotating magnetic field that interacts with the magnets of the rotor, causing the rotor to rotate. Because the stator has multiple phase windings the relative inductance between the windings can be used to determine rotor position.

"Sensorless" motor control refers to an approach where one or more characteristics of a motor, such as motor speed or rotor position, are mathematically derived. Sensorless motor control typically avoids the use of separate speed and position sensors that are mechanically attached to a motor.

SUMMARY

A method for motor control that improves the accuracy of rotor angle determination by accounting for motor non-linear behavior, and a motor controller that implements the method are disclosed herein. In one example, a motor controller includes current measurement circuitry and estimation circuitry. The current measurement circuitry is adapted to be coupled to a motor, and configured to measure current in the motor. The estimation circuitry is coupled to the current measurement circuitry, and includes a memory, current computation circuitry, and summation circuitry. The memory stores coefficients of a function for estimating current related to variation of inductance of the motor. The current computation circuitry is coupled to the memory, and is configured to compute a compensation current value based on the coefficients. The summation circuitry is coupled to the current compensation circuitry, and is configured to generate a position error signal by subtracting the compensation current value from a measured current value generated by the current measurement circuitry.

In another example, a method for motor control includes measuring a current flowing in a motor. An angle of a rotor of the motor is determined based on the measured current. A coefficient value is retrieved from memory based on the angle of the rotor. A compensation current value is computed based on the coefficient value. A position error signal is generated by computing a difference of the compensation current value and a value of the measured current. The position error signal is applied to adjust a value of the angle of the rotor.

In a further example, a motor controller includes a speed control circuit, a current measurement circuit, and an estimation circuit. The speed control circuit is adapted to be coupled to a motor, and configured to generate a reference current that controls the speed of the motor. The current measurement circuitry is adapted to be coupled to the motor and configured to measure current in the motor. The estimation circuitry is coupled to the current measurement circuitry. The estimation circuitry includes an observer, a memory, current computation circuitry and summation circuitry. The observer is configured to generate an estimate of current in the motor based on the reference current. The memory stores coefficients of a function for estimating current related to variation of inductance of the motor. The current computation circuitry is coupled to the memory and configured to compute a compensation current value based on the coefficients and the estimate of the current in the motor. The summation circuitry is coupled to the current compensation circuitry, and is configured to generate a position error signal by subtracting the compensation current value from a measured current value generated by the current measurement circuitry.

BRIEF DESCRIPTION OF THE DRAWINGS

For a detailed description of various examples, reference will now be made to the accompanying drawings in which.

DETAILED DESCRIPTION

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors. Additional symbols used here are defined in Table 1 below.

TABLE 1

Symbols and Notations

| Variable/Symbol | Description | Units |
|---|---|---|
| $R_s$ | Per phase resistance | ohm |
| $L_d$, $L_q$ | d-axis and q-axis inductance respectively | Henry |
| $L_0$ | $(L_d + L_q)/2$ | Henry |
| $L_2$ | $(L_d - L_q)/2$ | Henry |
| p | d/dt | 1/s |
| J | Total inertia rotor and color wheel | kg*m$^2$ |
| P | Number of pole pairs | |
| B | Friction damping factor | Nm/(rad/s) |
| $\lambda_m$ | Back-EMF constant | Wb |
| $\omega_m$, $\omega_e$ | Rotor mechanical, electrical frequency | rad/s |
| $f_m$, $f_e$ | Rotor mechanical, electrical frequency | Hz |
| $f_i$, $\omega_i$ | Injection frequency | Hz, rad/s |
| $\omega_{e,ref}$ | Rotor target electrical frequency | rad/s |
| $\theta_e$, $\hat{\theta}_e$, $\tilde{\theta}_e$ | Rotor electrical angle, estimate and estimation error respectively | rad |
| $V_\alpha$, $V_\beta$ | Voltages in the αβ reference frame | V |
| $V_d$, $V_q$ | Voltages in the d-q reference frame | V |
| $I_a$, $I_b$, $I_c$ | Phase current | A |
| $I_\alpha$, $I_\beta$ | Currents in the αβ reference frame | A |
| $I_d$, $I_q$ | Currents in the d-q reference frame | A |

In a sensorless motor control system, the absence of a significant back-electromotive force (EMF) signal at low rotor speeds necessitates signal injection methods that exploit rotor saliency to estimate angle based on rotor position dependent signatures in voltage and current. Most methods do not account for motor non-linearity such as saturation, cross-saturation and higher order saliencies that cause the inductance model to deviate from the constant inductance model. This simplification results in large angle errors in the angle estimate, which may lead to unstable operation at higher current levels. The circuits and methods disclosed herein improve the accuracy of rotor angle estimation by accounting for motor non-linear behavior.

Figure 1:
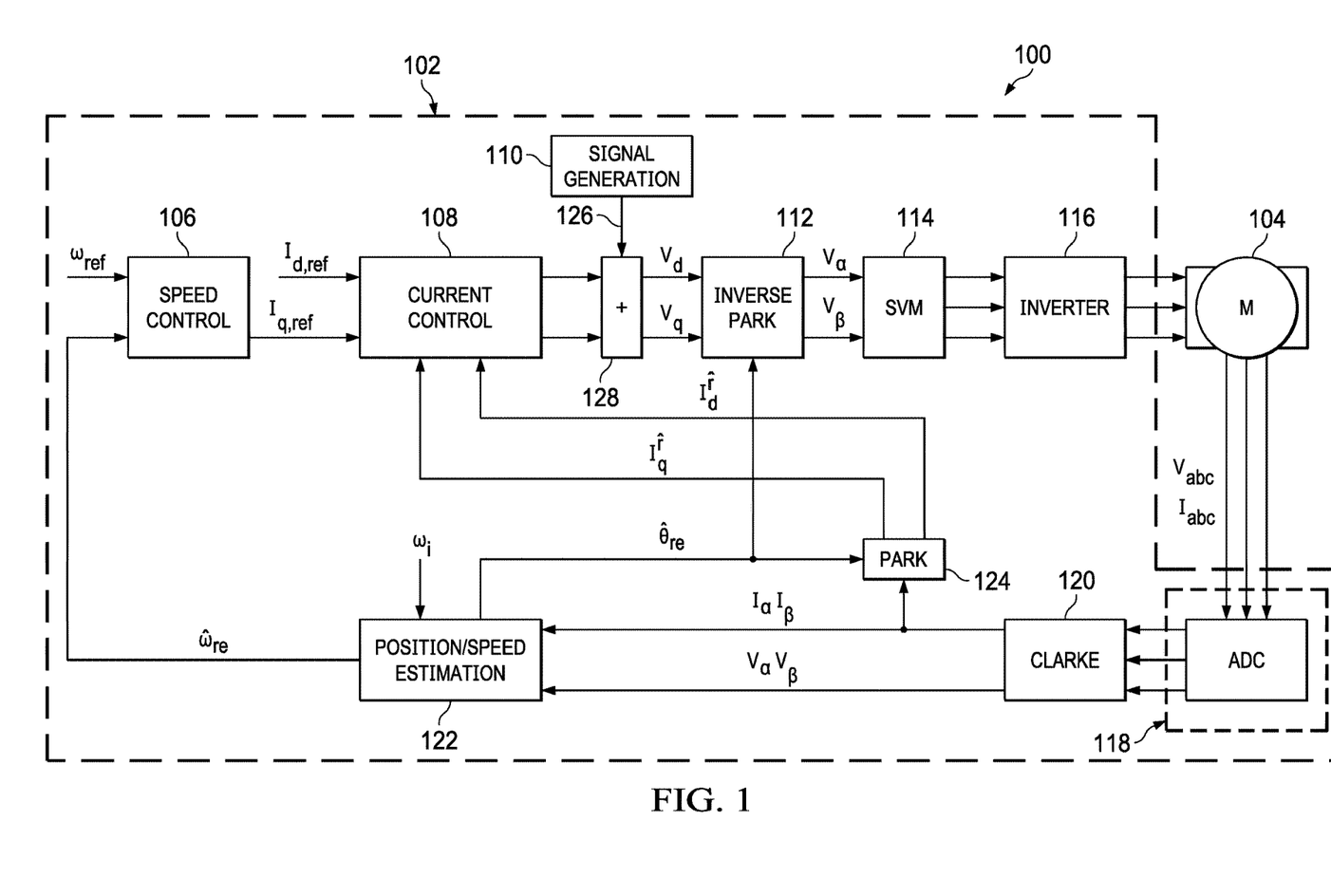
FIG. 1 shows a block diagram for an example motor control system in accordance with this description.

FIG. 1 shows a block diagram for a motor control system 100 in accordance with this description. The motor control system 100 includes a motor controller 102 and an electric motor 104 (e.g., a three-phase electric motor). The motor controller 102 is coupled to the electric motor 104. The motor controller 102 includes a speed control circuit 106, a current control circuit 108, a signal generation circuit 110, an inverse Park transform circuit 112, a space vector generation circuit 114, an inverter 116, measurement circuitry 118, a Clarke transform circuit 120, position and speed estimation circuitry 122, and Park transform circuit 124. The speed control circuit 106 receives a speed input $\omega_{ref}$ from an external source and compares $\omega_{ref}$ to $\hat{\omega}_{re}$ provided by the position and speed estimation circuitry 122. The speed control circuit 106 generates a reference current ($I_{q,ref}$) for the q-axis of the d-q reference frame. An additional reference current ($I_{d,ref}$) for the d-axis is supplied by the user to control the motor's magnetic field. In various implementations of the 100, the speed control circuit 106 may be replaced by a position control circuit or a torque/current control circuit.

Figure 2:
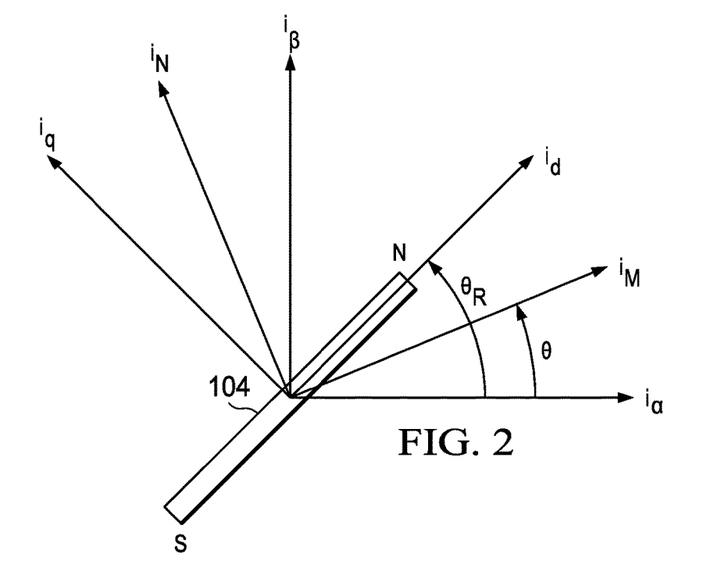
FIG. 2 shows a rotor of an electric motor with different coordinate systems.

FIG. 2 shows a rotor of the electric motor 104 with different coordinate systems referenced herein. The coordinate systems are referenced according to currents associated with a stator of the electric motor 104, which are referenced to the rotor 202 of the electric motor 104. The currents $I_q$ and $I_d$ relate to the q-axis and the d-axis of the electric motor 104 and are fixed with respect to the rotor 202. The d/q-axes relate to torque control of the electric motor 104 and are orthogonal. The $I_M$-axis and $I_N$-axis are arbitrary axes that are used as references for determining the position of the rotor 202. The $I_M$ and $I_N$ axes may be predetermined axes in the electric motor 104 from which the position of the rotor 202 is determined. The $I_\alpha$-axis and the $I_\beta$-axis represent an orthogonal coordinate system where the $I_\alpha$-axis is aligned with the phase of a motor winding. The angle of the rotor 202 based on the angle between the $I_\alpha$-axis and the $I_M$-axis is referred to as the angle θ. A rotational angle $\theta_R$ is defined as the angle between the $I_\alpha$-axis and the $I_d$-axis. As the rotor 202 rotates, the rotational angle $\theta_R$ changes wherein the change per unit time is equal to the velocity of the rotor 202.

Referring back to FIG. 1, the current control circuit 108 receives the q-axis reference current ($I_{q,ref}$) generated by the speed control circuit 106 and the d-axis reference current ($I_{d,ref}$) generated by the user, reduces the reference currents by the measured currents $I_d^{\hat{r}}$ and $I_q^{\hat{r}}$ respectively, and produces d and q axis voltages, $V_d$ and $V_q$. The signal generation circuit 110 provides a signal 126 that is added to the $V_d$ and/or the $V_q$ output of the current control circuit 108 by a summation circuit 128 to aid in estimation of the angle of the rotor 202. The inverse Park transform circuit 112 converts the voltages $V_d$ and $V_q$ to the alpha/beta domain to produce $V_\alpha$ and $V_\beta$. The space vector generation circuit 114 receives the voltages $V_\alpha$ and $V_\beta$ and generates a three-phase output signal. The inverter 116 converts the three-phase output of the space vector generation circuit 114 to alternating current signals to drive the electric motor 104.

The measurement circuitry 118 measures the current and voltage output of each phase of the electric motor 104. The measurement circuitry 118 includes voltage and current sensors to perform the measurements. The measurement circuitry 118 also includes an analog-to-digital converter to digitize the current and voltage measurements. The Clarke transform circuit 120 receives the digitized current and voltage measurements provide by the measurement circuitry 118 and generates alpha/beta domain voltage and current values. The alpha/beta domain voltage and current values generated by the Clarke transform circuit 120 are provided to the position and speed estimation circuitry 122 and the Park transform circuit 124 to generate speed ($\hat{\omega}_{re}$) current ($I_d^{\hat{r}}$, $I_q^{\hat{r}}$), and rotor angle ($\hat{\theta}_{re}$) estimates that are fed back to the speed control circuit 106, the current control circuit 108, and the inverse Park transform circuit 112 and Park transform circuit 124, respectively.

A basic implementation of the motor control system 100 is based on the constant inductance motor model shown in equation (1).

$$\begin{bmatrix} V_\alpha \\ V_\beta \end{bmatrix} = \begin{bmatrix} R_s + p(L_0 + L_2 \cos 2\theta_e) & pL_2 \sin 2\theta_e \\ pL_2 \sin 2\theta_e & R_s + p(L_0 - L_2 \cos 2\theta_e) \end{bmatrix} \begin{bmatrix} I_\alpha \\ I_\beta \end{bmatrix} + \omega_e \lambda_m \begin{bmatrix} -\sin \theta_e \\ \cos \theta_e \end{bmatrix} \quad (1)$$

When a tonal voltage signal is injected in the d-axis of the estimated reference frame (as shown in FIG. 1), the tonal components of the reflected currents in the d and q axes are given by equation (2).

$$\begin{bmatrix} I_d^{\hat{r}} \\ I_q^{\hat{r}} \end{bmatrix} = \frac{V_i \sin(\omega_i t)}{\omega_i} * \frac{1}{L_0^2 - L_2^2} \begin{bmatrix} L_0 - L_2 \cos 2(\hat{\theta}_e - \theta_e) \\ L_2 \sin 2(\hat{\theta}_e - \theta_e) \end{bmatrix} \quad (2)$$

From equation (2), the error signal $\sin 2(\hat{\theta}_e - \theta_e)$ is modulated up by the carrier frequency in the current $I_q^{\hat{r}}$.

Figure 3:
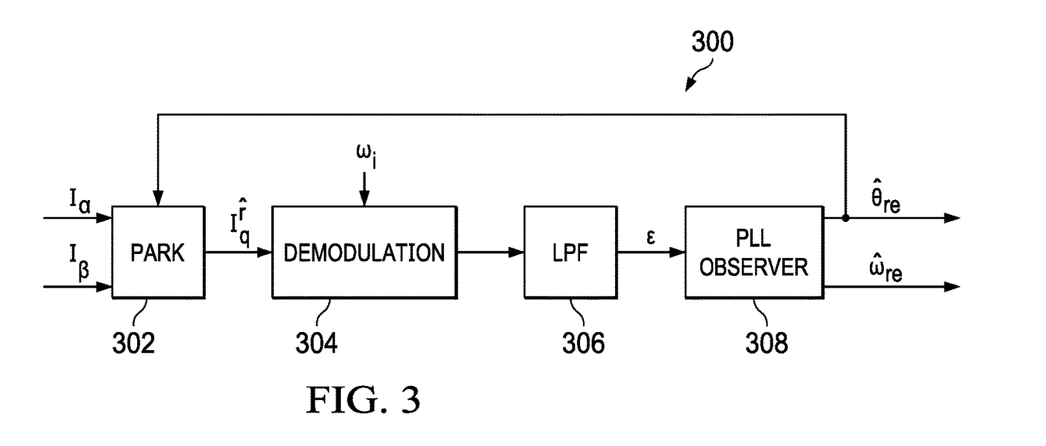
FIG. 3 shows a block diagram for an example of basic position estimation circuitry.
Figure 4:
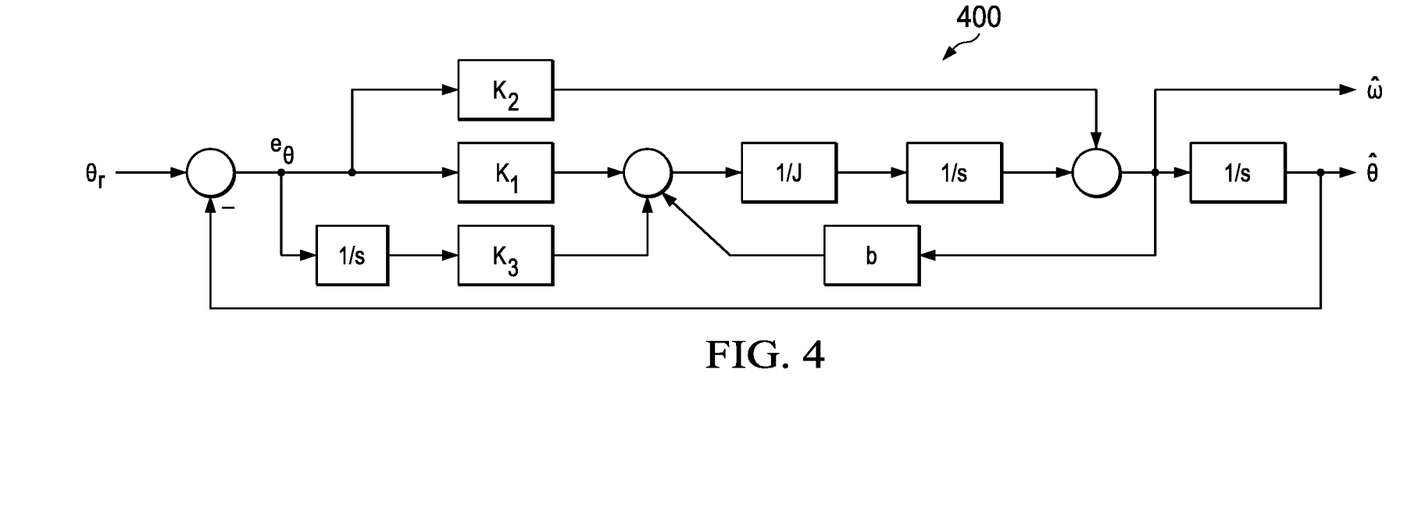
FIG. 4 shows a block diagram for an example Luenberger observer suitable for determining rotor angle in accordance with this description.
Figure 5:
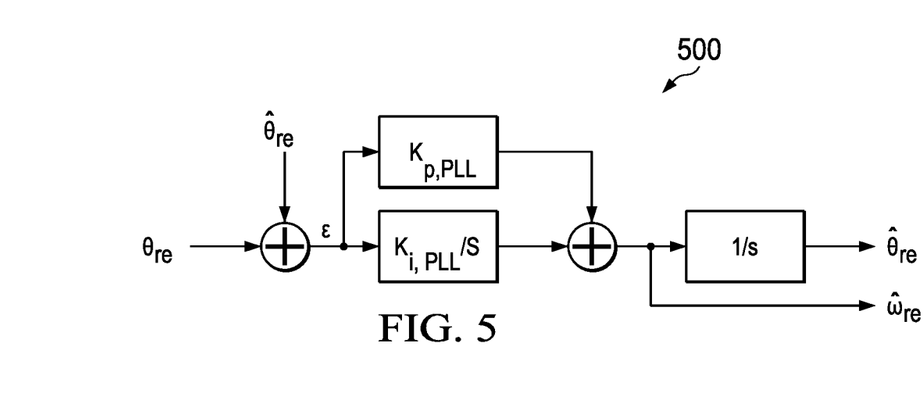
FIG. 5 shows a block diagram for a phase locked loop observer suitable for determining rotor angle in accordance with this description.

FIG. 3 shows an example of basic position and speed estimation circuitry 300. The basic position and speed estimation circuitry 300 is an implementation of the position and speed estimation circuitry 122. The basic position and speed estimation circuitry 300 includes Park transform circuit 302, demodulation circuitry 304, low-pass filter circuitry 306, and phased locked loop (PLL) observer circuitry 308. The Park transform circuit 302 computes q-axis current in the estimated reference frame $I_q^{\hat{r}}$. The demodulation circuitry 304 demodulates the $I_q^{\hat{r}}$ signal, and the low-pass filter circuitry 306 removes high frequency components to extract a signal dependent on position error $\sin 2(\hat{\theta}_e - \theta_e)$. The PLL observer circuitry 308 processes the error signal to drive the position error to zero, thereby obtaining an estimated rotor angle. FIG. 4 shows a block diagram for an example Luenberger observer 400, and FIG. 5 shows a block diagram for an example PLL observer 500. The PLL observer circuitry 308 may be implemented using the Luenberger observer 400 or the PLL observer 500.

The constant inductance motor flux to current relationship that leads to the model in equation (1) is given by equation (3).

$$\begin{bmatrix} \lambda_\alpha \\ \lambda_\beta \end{bmatrix} = \begin{bmatrix} (L_0 + L_2 \cos 2\theta_{re}) & L_2 \sin 2\theta_{re} \\ L_2 \sin 2\theta_{re} & (L_0 - L_2 \cos 2\theta_{re}) \end{bmatrix} \begin{bmatrix} i_\alpha \\ i_\beta \end{bmatrix} + \lambda_m \begin{bmatrix} \cos \theta_{re} \\ \sin \theta_{re} \end{bmatrix} \quad (3)$$

The inductance matrix under the assumption of constant inductances and no additional spatial harmonics forms the lower order inductance model, $(L_{\alpha\beta})_{lo}$, given by equation (4).

$$L_{\alpha\beta} \approx \begin{bmatrix} (L_0 + L_2 \cos 2\theta_{re}) & L_2 \sin 2\theta_{re} \\ L_2 \sin 2\theta_{re} & (L_0 - L_2 \cos 2\theta_{re}) \end{bmatrix} = (L_{\alpha\beta})_{lo} \quad (4)$$

However, positioning performance using such a lower order inductance model may be limited. For example, a wide range of error (−30° to 20°), depending on position, has been observed in some implementations.

As shown in equation (5), the motor model includes higher order, angle dependent inductance terms in additional to the signal term. In addition to the primary inductive saliency $L_2$, the inductance model includes higher order saliencies corresponding to $L_{hi}$, where 'i' denotes the order of the saliency. Each higher order saliency also has an associated phase $\varphi_i$.

$$L_{\alpha\beta} = (L_{\alpha\beta})_{lo} + (L_{\alpha\beta})_{ho} \quad (5)$$

where $$(L_{\alpha\beta})_{ho} = \begin{bmatrix} \sum_{i=2,3...}^{n} L_{hi} \cos(i\theta_{re} + \varphi_i) & \sum_{i=2,3...}^{n} L_{hi} \sin(i\theta_{re} + \varphi_i) \\ \sum_{i=2,3...}^{n} L_{hi} \sin(i\theta_{re} + \varphi_i) & -\sum_{i=2,3...}^{n} L_{hi} \cos(i\theta_{re} + \varphi_i) \end{bmatrix}$$

The higher order inductance terms, $(L_{\alpha\beta})_{ho}$, in the summation cause errors in the angle estimation if not modeled. The position estimation circuitry and methods disclosed herein account for the non-linear motor model whose parameters vary with current levels, and thereby improve position estimation accuracy.

The current in the estimated rotor frame (shown in equation (6)) has additional components because of the inductance variation.

$$I_{dq}^{\hat{r}} = [I_{L_0} - I_{L_2} e^{j(2\Delta\theta_{re})} + \Sigma_{i=2,3,\ldots}^{n} I_{L_{hi}} * e^{j(i\theta_{re} - 2\hat{\theta}_{re} - \varphi_i)}] * \sin(\omega_i t) \quad (6)$$

The constant inductance model, $I_{dq}^{\hat{r}} = [I_{L_0} - I_{L_2} e^{j(2\Delta\theta_{re})}] * \sin(\omega_i t)$, includes a position independent term $I_{dq}^{\hat{r}} = I_{L_0}$ and a position dependent term $I_{L_2} e^{j(2\Delta\theta_{re})}$. The basic position and speed estimation circuitry 300 extracts the position dependent term in $I_q^{\hat{r}}$ i.e., $I_{L_2} \sin(2\Delta\theta_{re})$.

The position determination circuitry and method disclosed herein remove the components in the current $I_q^{\hat{r}}$ that correspond to cross saturation, multiple saliencies, etc., leaving only the signal term. The high frequency q-axis current in the estimated rotor frame $I_q^{\hat{r}}$ can be expressed according to equation (7).

$$I_q^{\hat{r}} = (I_q^{\hat{r}})_s + (I_q^{\hat{r}})_h \quad (7)$$

where $$(I_q^{\hat{r}})_s = \{a_2 \sin 2\Delta\theta_{re}\} * \sin(\omega_i t)$$

and $$(I_q^{\hat{r}})_h = \{b_2 \cos 2\Delta\theta_{re} + \Sigma_{i=3,\ldots}^{n} a_i \sin(i\theta_{re} - 2\hat{\theta}_{re}) + b_i \cos(i\theta_{re} - 2\hat{\theta}_{re})\} * \sin(\omega_i t).$$

The coefficients $a_i$ and $b_i$, which represent the contribution of higher order saliencies to the injected current, vary with current level and frequency. These coefficients are related to the underlying inductance model terms $L_{hi}$ and $\varphi_i$. The circuits and methods of position determination disclosed herein determine and apply the coefficients to improve position estimation.

Figure 6:
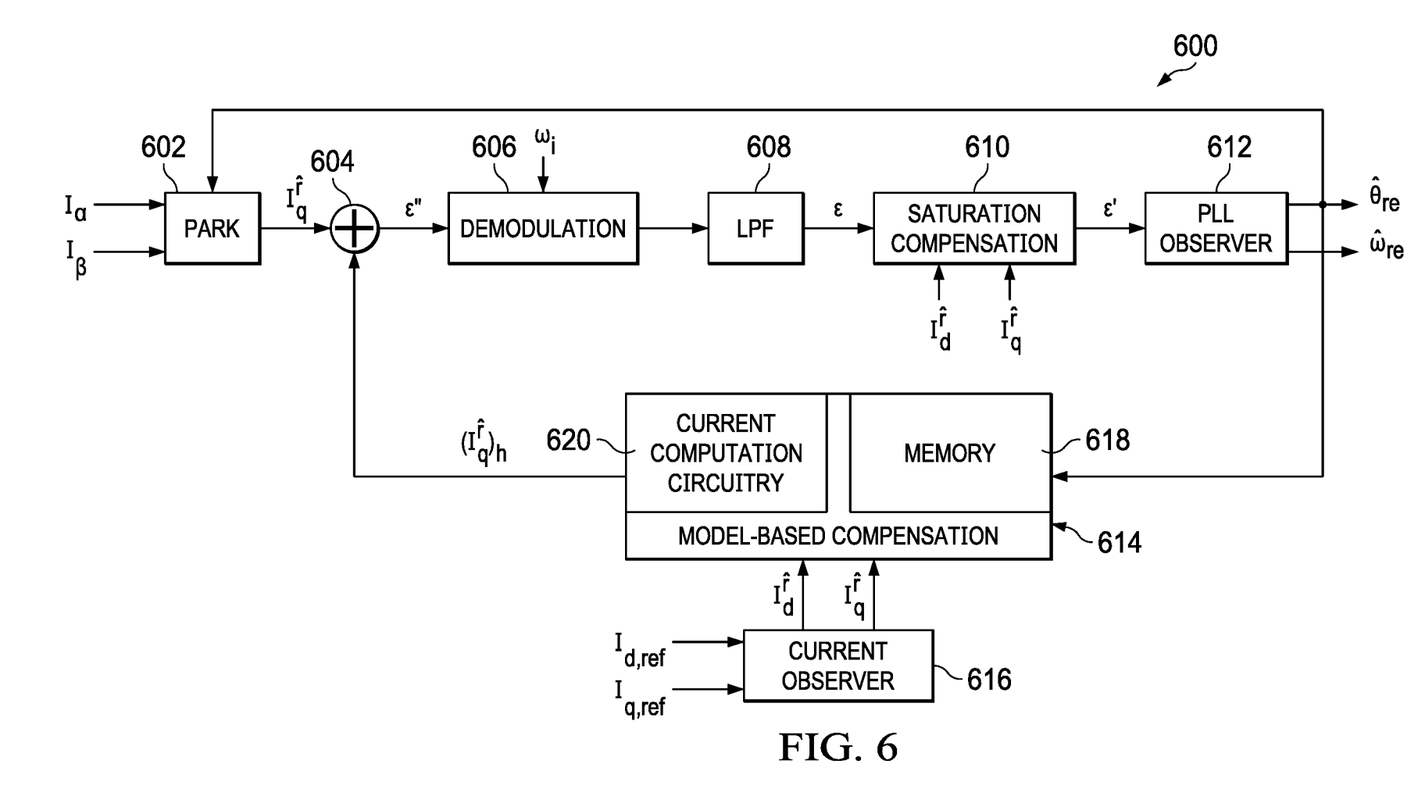
FIG. 6 shows a block diagram for rotor angle estimation circuit that includes compensation for spatial harmonics in the inductance of an electric motor in accordance with this description.

FIG. 6 shows a block diagram for example position estimation circuitry 600 that includes compensation for spatial harmonics in the inductance of a motor in accordance with this description. The position estimation circuitry 600 is an implementation of the position and speed estimation circuitry 122, and uses compensation coefficients to extract a position error signal that is used to improve position estimation. Values of the coefficients are determined in an offline motor characterization process that is described herein. The position estimation circuitry 600 includes a Park transform circuit 602, a summation circuit 604, demodulation circuitry 606, low pass filter circuitry 608, saturation compensation circuitry 610, observer circuitry 612, model-based compensation circuitry 614, and feed-forward observer circuitry 616. The model-based compensation circuitry 614 includes a memory 618 and current computation circuitry 620. The memory 618 stores coefficients ($a_i$ and $b_i$) of a function (see equation (7)) for estimating current related to variation of inductance in the electric motor 104. The current computation circuitry 620 is coupled to the memory 618 and computes a compensation current value based on the coefficients stored in the memory 618.

The position estimation circuitry 600 removes terms corresponding to cross saturation ($b_2 \cos 2\Delta\theta_{re}$) and higher order inductance saliencies $\Sigma_{i=3,\ldots}^{n} a_i \sin((i-2)\hat{\theta}_{re}) + b_i \cos((i-2)\vec{\theta}_{re})$ from the current in the estimated rotor frame, which is also the frame of signal injection. The Park transform circuit 602 computes q-axis current in the estimated reference frame $I_q^{\hat{r}}$. The summation circuit 604 is coupled to the Park transform circuit 602 and the model-based compensation circuitry 614, and subtracts a compensation value $(I_q^{\hat{r}})_h$ provided by the model-based compensation circuitry 614 from the q-axis current to produce an error signal ε". The compensation step can be expressed as:

$$\varepsilon'' \approx I_q^{\hat{r}} - (I_q^{\hat{r}})_h \quad (8)$$

After the subtraction, the residual current takes the following form $$\varepsilon'' = a_2 \sin 2\Delta\theta_{re} * \sin(\omega_c t) \quad (9)$$

which only contains the position error signal $\sin 2\Delta\theta_{re}$ modulated to higher frequency $\omega_i$.

The demodulation circuitry 606 demodulates the error signal, and the low pass filter circuitry 608 removes high frequency components of the demodulated error signal to produce the baseband position error signal $\varepsilon = a_2 \sin 2\Delta\theta_{re}$. The coefficient $a_2$ is a function of $I_d$ and $I_q$. The saturation compensation circuitry 610 normalizes the error signal for its dependence on current according to equation (10).

$$\varepsilon' = \frac{a_2(0,0)}{a_2(I_d^{\hat{r}}, I_q^{\hat{r}})} \varepsilon \quad (10)$$

The resulting position error signal $\varepsilon' = a_2(0,0) \sin 2\Delta\theta_{re}$ produced by the saturation compensation circuitry 610 is processed by the observer circuitry 612 to generate a position estimate (e.g., a rotor angle estimate). The subtraction performed by the summation circuit 604 requires knowledge of the rotor angle, and the estimated rotor angle is used by the Park transform circuit 602 and the model-based compensation circuitry 614 as a substitute for the true rotor angle. The Park transform circuit 602 and the model-based compensation circuitry 614 apply the rotor angle estimate to generate the values of current $I_q^{\hat{r}}$ and $(I_q^{\hat{r}})_h$ provided to the summation circuit 604. Accordingly, the compensation performed by the position estimation circuitry 600 assumes that the estimate ($\hat{\theta}_{re}$) of the rotor angle is close to the true rotor angle.

The coefficients $a_i$ and $b_i$ (as per equation (7)) are functions of the currents $I_d$ and $I_q$, the d and q axes currents in the true rotor frame. As these signals are not available for use in the compensation, the position estimation circuitry 600 generates estimates of $I_d$ and $I_q$. Instead of using the measured currents to provide $I_q^{\hat{r}}$ and $I_d^{\hat{r}}$ to the model-based compensation circuitry 614, the feed-forward observer circuitry 616 generates the estimates $I_d^{\hat{r}}$ and $I_q^{\hat{r}}$ based on the reference currents $I_{d,ref}$ and $I_{q,ref}$ provided by the speed control circuit 106. This approach mitigates the impact of the residual harmonics in the measured $I_q^{\hat{r}}$ and $I_d^{\hat{r}}$, which could cause the harmonics to recirculate in the estimation-control loop.

The various circuits of the motor control system 100 and/or the position estimation circuitry 600 may be implemented as dedicated hardware circuits configured to perform the operations disclosed herein or as a processor (such as a microcontroller or digital signal processor) executing instructions that cause the processor to perform the functions disclosed herein. For example, one or more of the Park transform circuit 602, a summation circuit 604, demodulation circuitry 606, low pass filter circuitry 608, saturation compensation circuitry 610, observer circuitry 612, model-based compensation circuitry 614, and/or feed-forward observer circuitry 616 may be implemented as a processor coupled to a memory (i.e., a non-transitory computer-readable medium), where the memory stores instructions that cause the processor to perform the operations describe herein with respect to the circuits.

Figure 7:
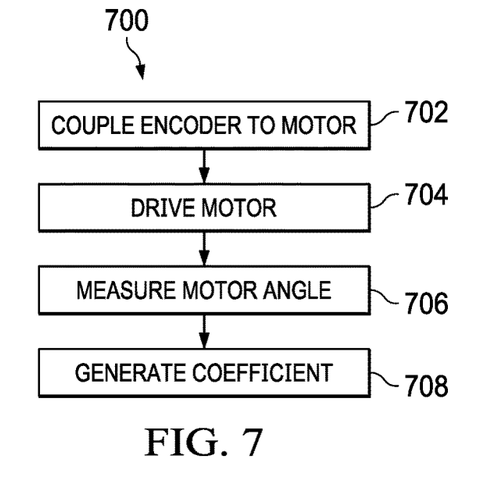
FIG. 7 shows a flow diagram for a method for determining coefficient values for use in compensation for spatial harmonics in the inductance of an electric motor in accordance with this description.

FIG. 7 shows a flow diagram for a method 700 for determining coefficient values for use in compensation for spatial harmonics in the inductance of a motor in accordance with this description. Though depicted sequentially as a matter of convenience, at least some of the actions shown can be performed in a different order and/or performed in parallel. Additionally, some implementations may perform only some of the actions shown. The operations of the method 700 are performed offline (i.e., as part of motor characterization performed prior to application-related use of the motor).

In block 702 an angle encoder is coupled to an electric motor to be characterized. For example, an angle encoder is coupled to an instance of the electric motor 104, where the electric motor 104 is to be characterized.

In block 704, the electric motor is driven at the $(I_d, I_q)$ bias points at which characterization is desired.

In block 706, information such as the rotor angle and motor current are measured. For example, rotor angle is measured via the angle encoder coupled to the electric motor. In a first measurement step, signal is injected in the electric motor in block 704 such that $\hat{\theta}_{re}=\theta_{re}$, and in block 706 $I_q^{\hat{r}}$, $\theta_{re}$ and $\sin(\omega_c t)$ are measured and recorded. In a second measurement step, signal is injected in the electric motor in block 704 such that $\hat{\theta}_{re}=\theta_{re}+\pi/4$, and in block 706 $I_q^{\hat{r}}$, $\theta_{re}$ and $\sin(\omega_c t)$ are measured and recorded.

In block 708, coefficients for storage in the memory 618 are generated based on information acquired in block 706. The information is processed via curve fitting to generate the coefficients $a_i$ and $b_i$ as a function of currents.

Some implementations of the method 700 generate coefficient values without use of an encoder. In such implementations, the electric motor is rotated at a high speed, and back-EMF of the motor is measured. The measured back-EMF of the motor operating according to a motor position model at high speed is used to generate the coefficient values for the motor operating at a lower speed.

Figure 8:
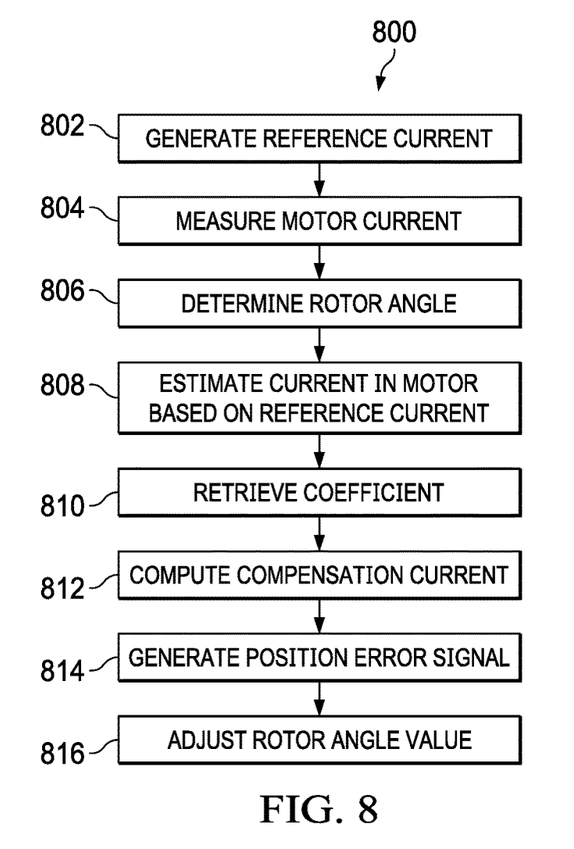
FIG. 8 shows a flow diagram for a method of motor control that includes compensation for spatial harmonics in the inductance of an electric motor in accordance with this description.

FIG. 8 shows a flow diagram for a method 800 of motor control that includes compensation for spatial harmonics in the inductance of a motor in accordance with this description. Though depicted sequentially as a matter of convenience, at least some of the actions shown can be performed in a different order and/or performed in parallel. Additionally, some implementations may perform only some of the actions shown. The operations of the method 800 may be performed by an example motor control system 100 that includes an implementation of the position estimation circuitry 600.

In block 802, the speed control circuit 106 generates a reference current to drive the electric motor 104. For example, the speed control circuit 106 generates the reference current $(I_{q,ref})$ based on a speed input $\omega_{ref}$ received from an external source and $\hat{\omega}_{re}$ received from the position and speed estimation circuitry 122.

In block 804, the measurement circuitry 118 measures the current and voltage in the electric motor 104.

In block 806, the observer circuitry 612 determines an angle ($\hat{\theta}_{re}$) of the rotor of the electric motor 104.

In block 808, the feed-forward observer circuitry 616 estimates currents ($I_d^{\hat{r}}$ and $I_q^{\hat{r}}$) in the electric motor 104 based on the reference current generated by the 802.

In block 810, the current computation circuitry 620 retrieves a coefficient from the memory 618 based on the current estimate generated in block 808 and the rotor angle estimate generated in block 806.

In block 812, the current computation circuitry 620 computes a compensation current $(I_q^r)_h$ based on the coefficient retrieved in block 810.

In block 814, the position estimation circuitry 600 generates a position error signal. The position error signal may be computed as a difference of the compensation current value and a value of the measured current. For example, the summation circuit 604 computes an error signal as a difference of $I_q^r$ and $(I_q^r)_h$. The position error signal is a modulated position error signal, and the position error signal is demodulated and low-pass filtered to generate a baseband position error signal. The baseband position error signal is normalized for dependence on current.

In block 816, the observer circuitry 612 applies the error signal to adjust the estimated angle of the rotor of the electric motor 104.

Figure 9:
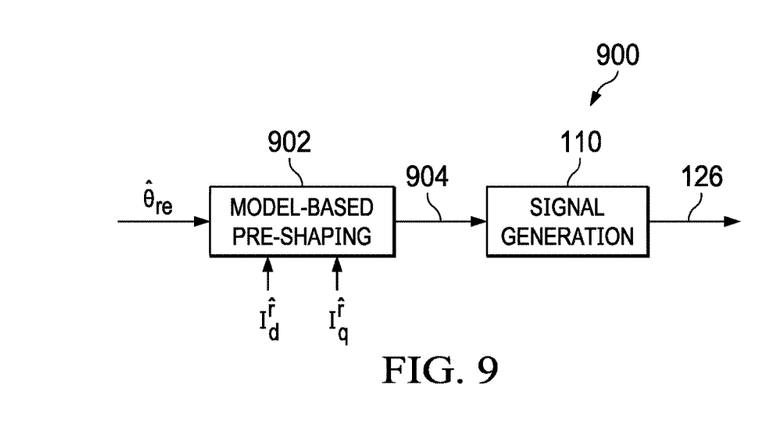
FIG. 9 shows an example of compensation performed prior to signal generation using a model-based pre-shaping circuit in accordance with this description.

In some implementations of the motor control system 100, compensation is performed prior to generation of the signal 126. FIG. 9 shows the signal generation circuit 110 coupled to a model-based pre-shaping circuit 902. The model-based pre-shaping circuit 902 is similar to the model-based compensation circuitry 614, and includes a memory for storing coefficients. The model-based pre-shaping circuit 902 generates, based on the stored coefficients, a signal 904 that is provided to the signal generator circuit 110. The signal generation circuit 110 applies the signal 904 to shape the signal 126. The model-based pre-shaping circuit 902 generates the signal 904 based on the current $(I_d^r, I_q^r)$ estimates generated by the feed-forward observer circuitry 616, and rotor angle $(\hat{\theta}_{re})$ estimates generated by the observer circuitry 612.

Figure 10:
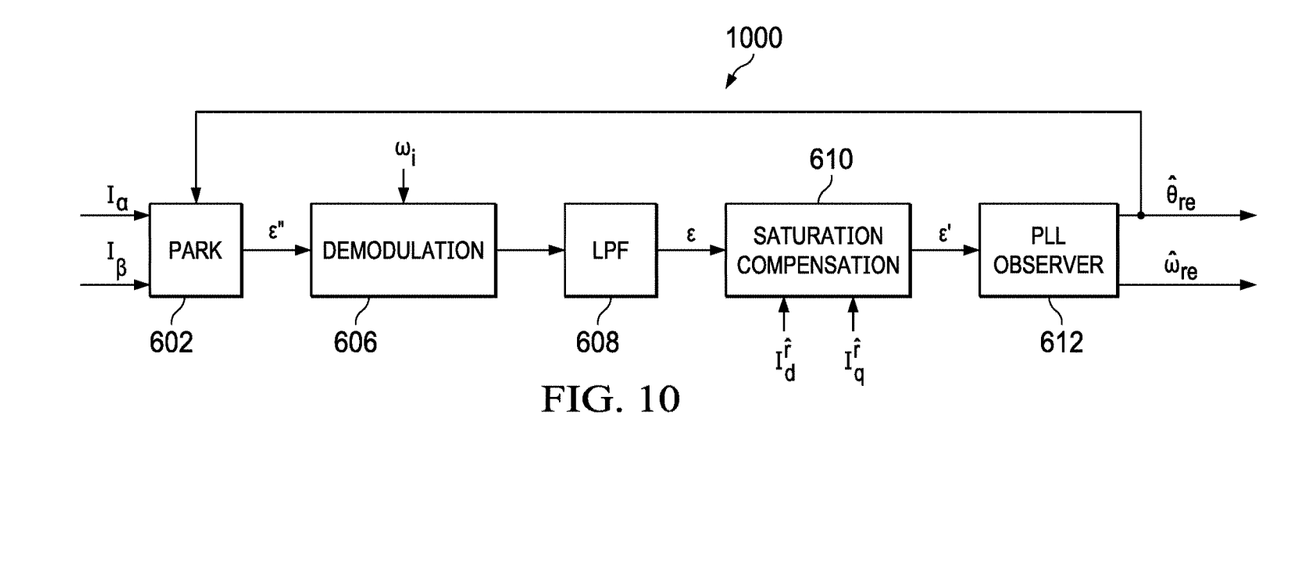
FIG. 10 shows a block diagram for example position estimation circuitry suitable for use with a model-based pre-shaping circuit in accordance with this description.

FIG. 10 shows a block diagram for example position estimation circuitry 1000 suitable for use with the model-based pre-shaping circuit 902. The position estimation circuitry 1000 is an implementation of the position and speed estimation circuitry 122. The position estimation circuitry 1000 is similar to the position estimation circuitry 600, but lacks the summation circuit 604 and the model-based compensation circuitry 614 because compensation is performed using the model-based pre-shaping circuit 902, the signal generation circuit 110, and the summation circuit 128.

Modifications are possible in the described embodiments, and other embodiments are possible, within the scope of the claims.

What is claimed is:

1. A motor controller comprising:
   current measurement circuitry adapted to be coupled to a motor, and configured to measure current in the motor; and
   estimation circuitry coupled to the current measurement circuitry, and comprising:
      a memory storing coefficients of a function for estimating current related to variation of inductance of the motor;
      current computation circuitry coupled to the memory, and configured to compute a compensation current value based on the coefficients; and
      summation circuitry coupled to the current computation circuitry, and configured to apply the compensation current value to correct for spatial harmonics in the inductance of the motor.

2. The motor controller of claim 1, further comprising:
   a control circuit configured to generate a reference current that controls the motor;
   wherein the estimation circuitry comprises a feed-forward observer configured to generate an estimate of the current in the motor based on the reference current.

3. The motor controller of claim 2, wherein:
   the control circuit is a speed control circuit and a reference speed indicates a desired speed of the motor;
   the control circuit is a position control circuit and a reference position indicates a desired position of the motor; or
   the control circuit is a torque/current control circuit and a reference torque/current indicates a desired torque/current of the motor.

4. The motor controller of claim 2, wherein the current computation circuitry is configured to compute the compensation current based on the estimate of the current in the motor generated by the feed-forward observer.

5. The motor controller of claim 1, further comprising an observer configured to generate a position and/or velocity estimate of a rotor of the motor, wherein the current computation circuitry is configured to compute the compensation current based on the estimate of the angle of the rotor generated by the observer.

6. The motor controller of claim 5, wherein the summation circuitry is configured to generate a residual current signal by subtracting the compensation current value from a measured current value generated by the current measurement circuitry.

7. The motor controller of claim 6, wherein:
   the residual current signal is a modulated position error signal; and
   the estimation circuitry is configured to demodulate and low pass filter the residual current signal to generate a baseband position error signal.

8. The motor controller of claim 7, wherein the estimation circuitry is configured to normalize the baseband position error signal for dependence on current.

9. The motor controller of claim 8, wherein the observer is configured to generate a position and/or velocity estimate of the rotor of the motor based on the normalized baseband position error.

10. A method for motor control, comprising:
    measuring a current flowing in a motor;
    determining an angle of a rotor of the motor based on the measured current;
    retrieving a coefficient value from memory based on the angle of the rotor;
    computing a compensation current value based on the coefficient value;
    generating a residual current signal by computing a difference of the compensation current value and a value of the measured current; and
    applying the residual current signal to adjust a value of the angle of the rotor.

11. The method of claim 10, further comprising:
    generating a reference current that controls a speed of the motor; and
    generating, by a feed-forward observer, an estimate of the current flowing in the motor based on the reference current.

12. The method of claim 11, further comprising computing the compensation current value based on the estimate of the current flowing in the motor generated by the feed-forward observer.

13. The method of claim 12, wherein the residual current signal is a modulated position error signal, and the method further comprising generating a baseband position error signal by demodulating and low-pass filtering the modulated position error signal.

14. The method of claim 13, further comprising normalizing the baseband position error signal for dependence on current.

15. The method of claim 14, further comprising generating the estimate of the angle of the rotor of the motor based on the normalized baseband position error.

16. The method of claim 10, further comprising:
coupling an encoder to the motor; and
generating coefficients, comprising the coefficient value, based on a measured angle of the motor provided by the encoder.

17. The method of claim 10, further comprising:
rotating the motor at a first speed;
measuring back electromotive force of the motor at the first speed; and
generating, based on the back electromotive force, coefficients comprising the coefficient value, for inductance of the motor operating at a second speed;
wherein the first speed is higher than the second speed.

18. A motor controller, comprising:
a speed control circuit adapted to be coupled to a motor, and configured to generate a reference current that controls the speed of the motor;
current measurement circuitry adapted to be coupled to the motor, and configured to measure current in the motor; and
estimation circuitry coupled to the current measurement circuitry, and comprising:
an observer configured to generate an estimate of current in the motor based on the reference current;
a memory storing coefficients of a function for estimating current related to variation of inductance of the motor;
current computation circuitry coupled to the memory and configured to compute a compensation current value based on the coefficients and the estimate of the current in the motor; and
summation circuitry coupled to the current computation circuitry, and configured to generate a residual current signal by subtracting the compensation current value from a measured current value generated by the current measurement circuitry.

19. The motor controller of claim 18, wherein:
the observer is a first observer; and
the estimation circuitry comprises a second observer configured to generate a position and/or velocity estimate of the rotor of the motor.

20. The motor controller of claim 19, wherein the current computation circuitry is configured to compute the compensation current based on the estimate of the angle of the rotor generated by the second observer.

21. The motor controller of claim 20, wherein:
the residual current signal is a modulated position error signal; and
the estimation circuitry is configured to demodulate and low pass filter the modulated position error signal to generate a baseband position error signal.

22. The motor controller of claim 21, wherein the estimation circuitry is configured to normalize the baseband position error signal for dependence on current.

23. The motor controller of claim 22, wherein the second observer is configured to generate the estimate of the angle of the rotor of the motor based on the normalized baseband position error.

* * * * *